United States Patent
Cohen et al.

(10) Patent No.: US 7,450,758 B2
(45) Date of Patent: Nov. 11, 2008

(54) STYLIZATION OF VIDEO

(75) Inventors: Michael F. Cohen, Seattle, WA (US);
Ying-Qing Xu, Beijing (CN);
Heung-Yeung Shum, Bellevue, WA (US); Jue Wang, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/942,606

(22) Filed: Nov. 19, 2007

(65) Prior Publication Data

US 2008/0063274 A1 Mar. 13, 2008

Related U.S. Application Data

(62) Division of application No. 10/814,851, filed on Mar. 31, 2004.

(51) Int. Cl.
*G06K 9/00* (2006.01)

(52) U.S. Cl. .............. 382/173; 382/103; 382/162; 382/165; 382/305; 382/176; 382/203; 382/202; 382/224; 382/128; 382/275; 345/177; 345/173; 345/427; 348/565; 348/273; 348/254; 348/335; 375/240.11; 375/240.23; 378/62; 378/87

(58) Field of Classification Search .......... 382/284, 382/128, 299, 173, 103, 162, 165, 305, 176, 382/203, 202, 224, 275; 345/427, 177, 173; 348/565, 273, 254, 335; 378/62, 87
See application file for complete search history.

(56) References Cited

U.S. PATENT DOCUMENTS

| | | | |
|---|---|---|---|
| 6,687,329 B1 * | 2/2004 | Hsieh et al. ............... 378/62 |
| 6,795,567 B1 * | 9/2004 | Cham et al. .............. 382/103 |
| 7,194,110 B2 * | 3/2007 | Qian ..................... 382/103 |
| 7,206,029 B2 * | 4/2007 | Cohen-Solal ............. 348/565 |
| 7,295,720 B2 * | 11/2007 | Raskar ................... 382/312 |
| 7,313,574 B2 * | 12/2007 | Paalasmaa et al. ....... 707/104.1 |
| 2003/0195883 A1 * | 10/2003 | Mojsilovic et al. ........... 707/6 |
| 2003/0234772 A1 * | 12/2003 | Zhang et al. .............. 345/177 |
| 2005/0226323 A1 * | 10/2005 | Secker ................ 375/240.11 |
| 2005/0226502 A1 * | 10/2005 | Cohen et al. .............. 382/173 |
| 2005/0286764 A1 | 12/2005 | Mittal et al. |
| 2006/0269106 A1 * | 11/2006 | Staring et al. ............. 382/128 |
| 2006/0285747 A1 | 12/2006 | Blake et al. |

(Continued)

OTHER PUBLICATIONS

A Mid-Level Description of Video, with Application to Non-photorealistic Animation, J. P. Collomosse and P. M. Hall, Department of Computer Scienc.*

(Continued)

*Primary Examiner*—Samir A Ahmed
*Assistant Examiner*—Nancy Bitar
(74) *Attorney, Agent, or Firm*—Lee & Hayes, PLLC

(57) ABSTRACT

The techniques and mechanisms described herein are directed to a system for stylizing video, such as interactively transforming video to a cartoon-like style. Briefly stated, the techniques include determining a set of volumetric objects within a video, each volumetric object being a segment. Mean shift video segmentation may be used for this step. With that segmentation information, the technique further includes indicating on a limited number of keyframes of the video how segments should be merged into a semantic region. Finally, a contiguous volume is created by interpolating between keyframes by a mean shift constrained interpolation technique to propagate the semantic regions between keyframes.

6 Claims, 10 Drawing Sheets

U.S. PATENT DOCUMENTS

2007/0086622 A1* 4/2007 Sun et al. ............... 382/103
2007/0092122 A1* 4/2007 Xiao et al. ............... 382/128
2007/0237393 A1* 10/2007 Zhang et al. ............. 382/173

OTHER PUBLICATIONS

Stylized Video Cubes; Allison W. Klein, Peter-Pike J. Sloan, Adam Finkelstein, Michael F. Cohen, Jul. 2002.*
Mean shift:A robust approach toward feature space analysis, IEEE 2002.*
A Survey of Spatio-Temporal Grouping Techniques, DeMenthon et al, Aug. 2002.*
Stylization and Abstraction of Photographs, Santella et al, SIGGRAPH 2002.*
Painterly Rendering for Animation, Barbara J. Meier, Walt Disney Feature Animation.*
Spatio-Temporal Segmentation of Video by Hierarchical Mean Shift Analysis, DeMenthon et al.*
Chan, et al., "A Hybrid Approach to Video Retrieval in a Genetic Video Management and ApplicationProcessing Framework", IEEE, Aug. 22-25, 2001, pp. 505-508.
Bennet, et al., "Proscenium: A Framework for Spatio-Temporal Video Editing", ACM, 2003, pp. 8.
DeMenthon, et al., "Spatio-Temporal Segmentation of Video by Hierarchical Mean Shift Analysis", IEEE, 2001, pp. 24.
DeMenthon, et al., "Video Retrieval Using Spatio-Temporal Descriptors", ACM, 2003, pp. 6.
Wang, et al., "Video Tooning", University of Washington, pp. 10, no date available.

* cited by examiner

STYLIZATION OF VIDEO

RELATED APPLICATIONS

This is a division of application Ser. No. 10/814,851, filed Mar. 31, 2004, entitled "Stylization of Video," which is hereby incorporated by reference herein.

TECHNICAL FIELD

This document generally relates to the stylization of video, and more particularly, to the non-photorealistic rendering of video data.

Video stylization is an area of increasing interest. More and more people are creating their own videos using increasing numbers of video creation and editing tools. As usage increases, so too does the demand for newer and better ways to manipulate or stylize video, particularly in an automated fashion. One stylization method that has yet been satisfactorily accomplished is the transformation of photorealistic video to a more cartoon-like style.

There are existing techniques for stylizing digital still images to achieve a result similar to a cartoon-like style. However, one cannot simply apply those same techniques to digital video imagery with the same level of satisfaction. Most often, because of subtle differences between frames of video data, the same techniques result in video having a "jumpiness" or noisy quality. Until now, there has not been a satisfactory solution to that problem.

SUMMARY

The techniques and mechanisms described herein are directed to a system for stylizing video, such as interactively transforming video to a cartoon-like style. Briefly stated, the techniques include determining a set of volumetric objects within a video, each volumetric object being a segment. Any three-dimensional color-based segmentation technique may be used for this step. One example of such a technique is anisotropic mean shift video segmentation. With that segmentation information, the technique further includes indicating on a limited number of keyframes of the video how segments should be merged into a semantic region. Finally, a contiguous volume is created by interpolating between keyframes by a mean shift constrained interpolation technique to propagate the semantic regions between keyframes.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
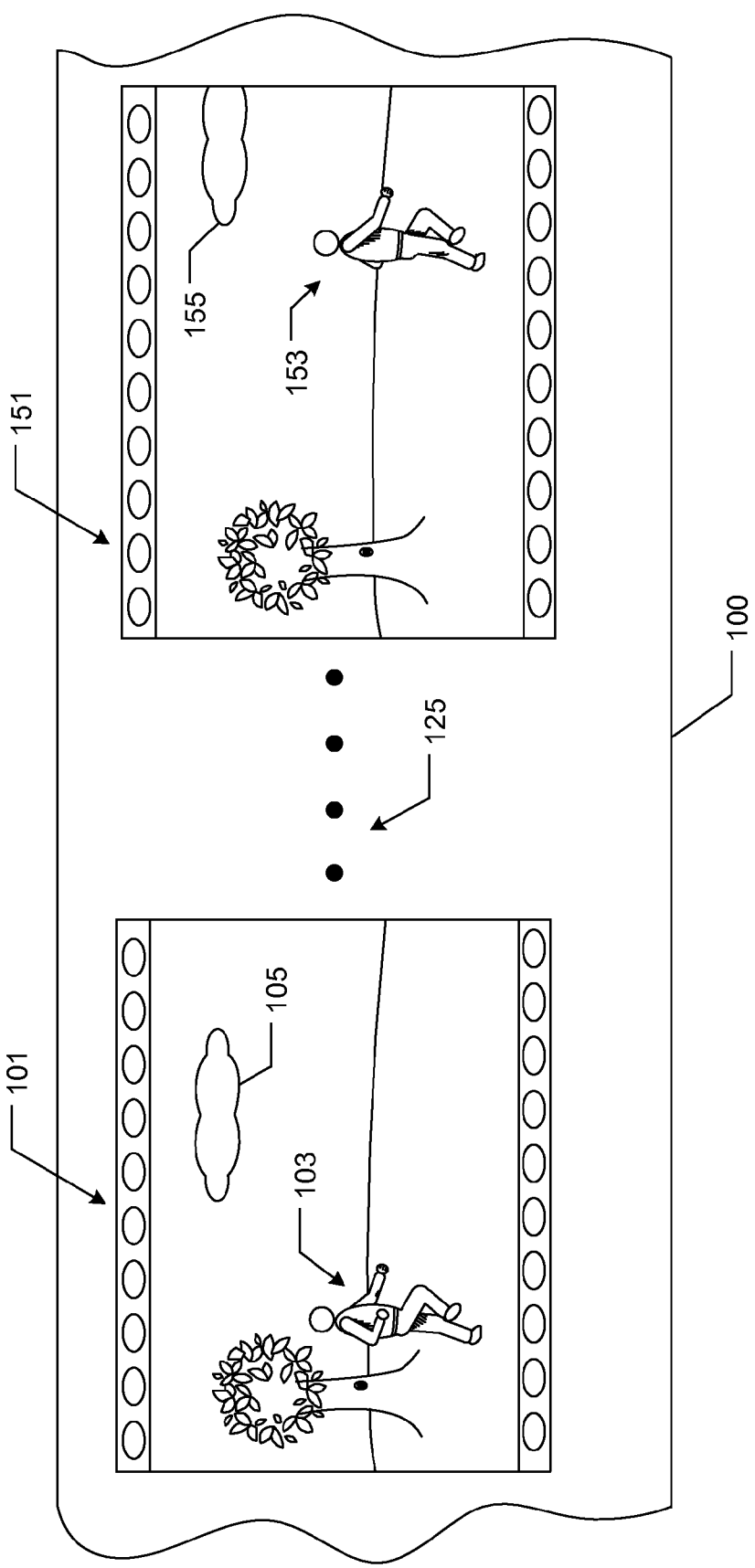
FIG. 1 is a graphical illustration of frames of a sample video that may be stylized in accordance with embodiments of the invention.

FIG. 1 is a graphical illustration of frames of a sample video. Generally speaking, the video is composed of video data for the creation of multiple frames of video where each frame differs slightly from another in such a way that viewing the series of frames gives the illusion of real motion. For example, referring to FIG. 1, an outdoor scene is presented that depicts a person walking from left to right. In a first frame 101, the person 103 is at the left of the scene and a cloud 105 is in the sky. The person 103 appears to be walking to the right of the scene. In a later frame 151, the person 153 has moved to the right side of the scene and is oriented slightly different. In addition, the cloud 155 has drifted more to the right of the scene. It will be appreciated that many other frames 125 exist between the first frame 101 and the latter frame 151. Various portions of the visual data are modified from frame to frame.

It should be noted that the graphical illustrations shown in the Figures have been drawn using simple lines and shapes for simplicity of discussion and to comply with certain rules that apply to patent applications. In actuality, it is envisioned that the techniques described here will be applied to video that is more photorealistic, however, the techniques have equal applicability to any video data having discernable segments.

Figure 2:
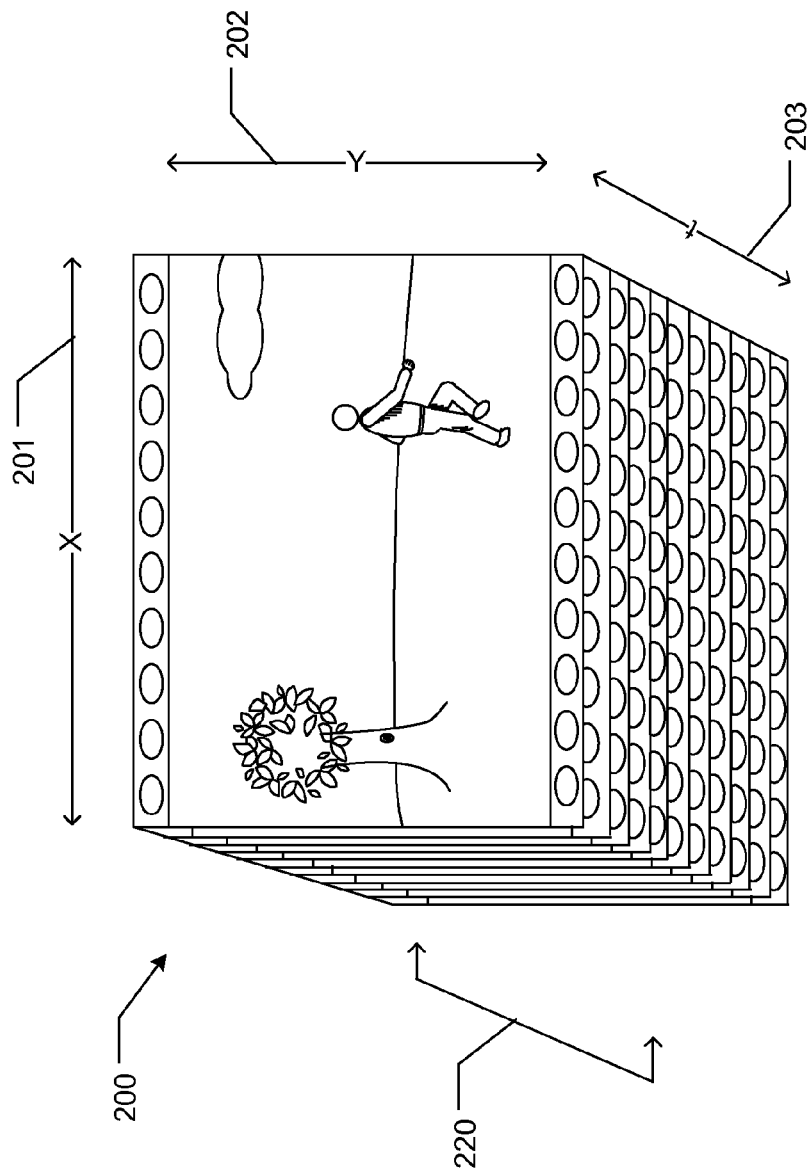
FIG. 2 is a graphical illustration of a conceptual three dimensional cube constructed with successive frames of the video illustrated in FIG. 1.

Referring now to FIG. 2, if each frame of the video 100 were (conceptually) stacked on top of each other, the result would be a three dimensional cube 200 that represents all the video data from the video 100. One axis 201 of the cube represents the horizontal direction of the video, another axis 202 represents the vertical position, and the third axis 203 represents time (or frame number).

Figure 3:
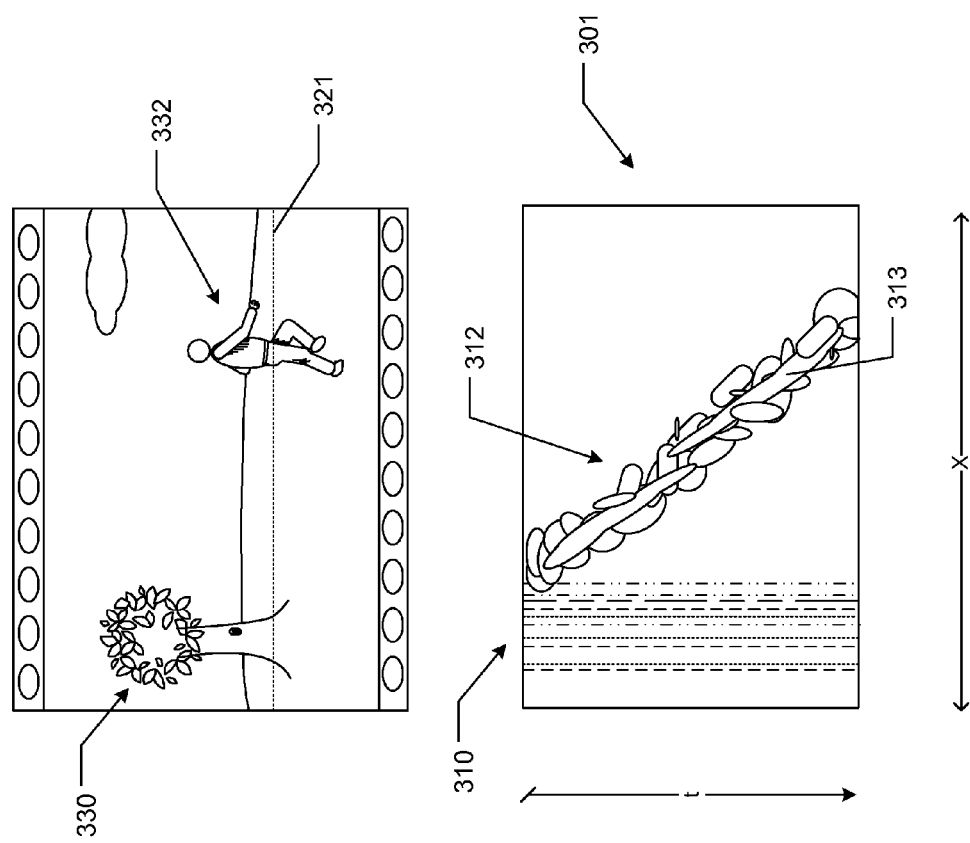
FIG. 3 is a graphical illustration of a slice taken from the cube in a plane parallel to the time axis.

A slice can be taken from the cube in a horizontal plane 220 that lies parallel to the x and time axes. Turning now to FIG. 3, the video data that lies in this slice 301 would illustrate the changes over time (t) to the pixels along a single line (x) 321. In other words, the slice 301 would represent the coloration of a particular line (e.g., line 321) of pixels of the video over time. More specifically, the top (as displayed in FIG. 3) of the slice 301 represents the coloration of the pixels along line 321 at the beginning of the video segment. The bottom (as displayed) of the slice 301 represents the coloration of the pixels along line 321 at the end of the video segment. The changes in the pixel coloration along line 321 are represented by the changes in the visual aspects of the slice 301 from top to bottom.

An examination of this data reveals regions of data that can be "segmented" into groups of pixels that may share some common characteristic, such as color. For instance, the slice 301 may represent a horizontal scan line of the video over time. A first series of shapes 310 extend from the top (i.e., earliest) of the slice 301 to the bottom. This first set of shapes 310 may represent the pixels associated with the tree 330 in the background of the scene. Because the tree changes little, if at all, over time the pixel coloration changes equally little, thus resulting in largely vertical lines in the slice 301. However, a second series of shapes 312 may represent a part of the person 332 as he moves across the scene. Because the person 332 is moving, the coloration of the pixels at positions where the person has been will change, resulting in areas having similar pixel coloration. In addition, it is likely that the coloration of the pixels will change over time in various ways, leading to regions of various shapes and sizes. For instance, region 313 may represent a portion of the person's pants that happened to be the same color (to within some predefined threshold) over a period of time.

Performing a spatio-temporal segmentation analysis on the various slices in the cube 200 results in three dimensional volumes of contiguous pixels having similar color. For the purposes of this document, each such volume is termed a "segment." Although any form of spatio-temporal video analysis may be used, the techniques described here have been used in conjunction with an anisotropic kernel mean shift segmentation analysis which serves as the subject of U.S. patent application Ser. No. 10/796,736, entitled "A SYSTEM AND METHOD FOR IMAGE AND VIDEO SEGMENTATION BY ANISOTROPIC KERNEL MEAN SHIFT," filed on Mar. 8, 2004, and expressly incorporated herein by reference for all purposes.

Video stylization may then be performed on each segment, which provides an end result significantly improved over the conventional "frame-by-frame" stylization. For example, one stylization of the video can be created by simply coloring a segment's pixels the average color of the segment and then slicing that in time to create a sort of "paint-by-number" non-photorealistic rendering. Alternatively, segment colors can be changed and/or segment edges drawn for artistic effect. Because of the spatio-temporal coherency of the segments, the "jumpiness" associated with conventional techniques is overcome.

Creating Semantic Regions

This document teaches techniques and mechanisms that enable more meaningful "semantic regions" to be created, and more elaborate stylization of the video data. More specifically, the techniques and mechanisms described here allow a user to provide input that identifies collections of segments that are semantically meaningful. For example, a typical viewer of the video shown in FIG. 1 may see the person's pants as one single visual entity. However, as illustrated in FIG. 3, subtle variations in lighting or texture—or any one or more of many other factors—results in the pants becoming multiple individual segments. Thus, the segments derived directly from a segmentation procedure are typically too low level to have semantic meaning. The following technique allows a user to overcome this by manually identifying those segments that have semantic meaning.

Briefly stated, the technique allows a user to identify a group of segments by "outlining" the segments. The outline encloses a number of segments that are subsequently treated as a larger entity, termed a "semantic region." The outlines drawn by the user indicates which low-level segments should be merged together to form a high-level semantic region. That outlining process may be performed on each of several "keyframes" rather than each successive frame in the video. The segmentation results provide the temporal information needed to apply the user's outlining from each keyframe to the in-between frames. This technique avoids the tedious frame-by-frame roto-scoping that has been previously employed.

The number of keyframes used may vary according to the intensity of the motion of the particular entity being identified. Generally, the more intensive and complex an object moves, the more keyframes would be used to achieve satisfying interpolated results in the in-between frames. The inventors have determined that even for relatively complex motions, keyframes every ten or fifteen frames may be sufficient.

Figure 4:
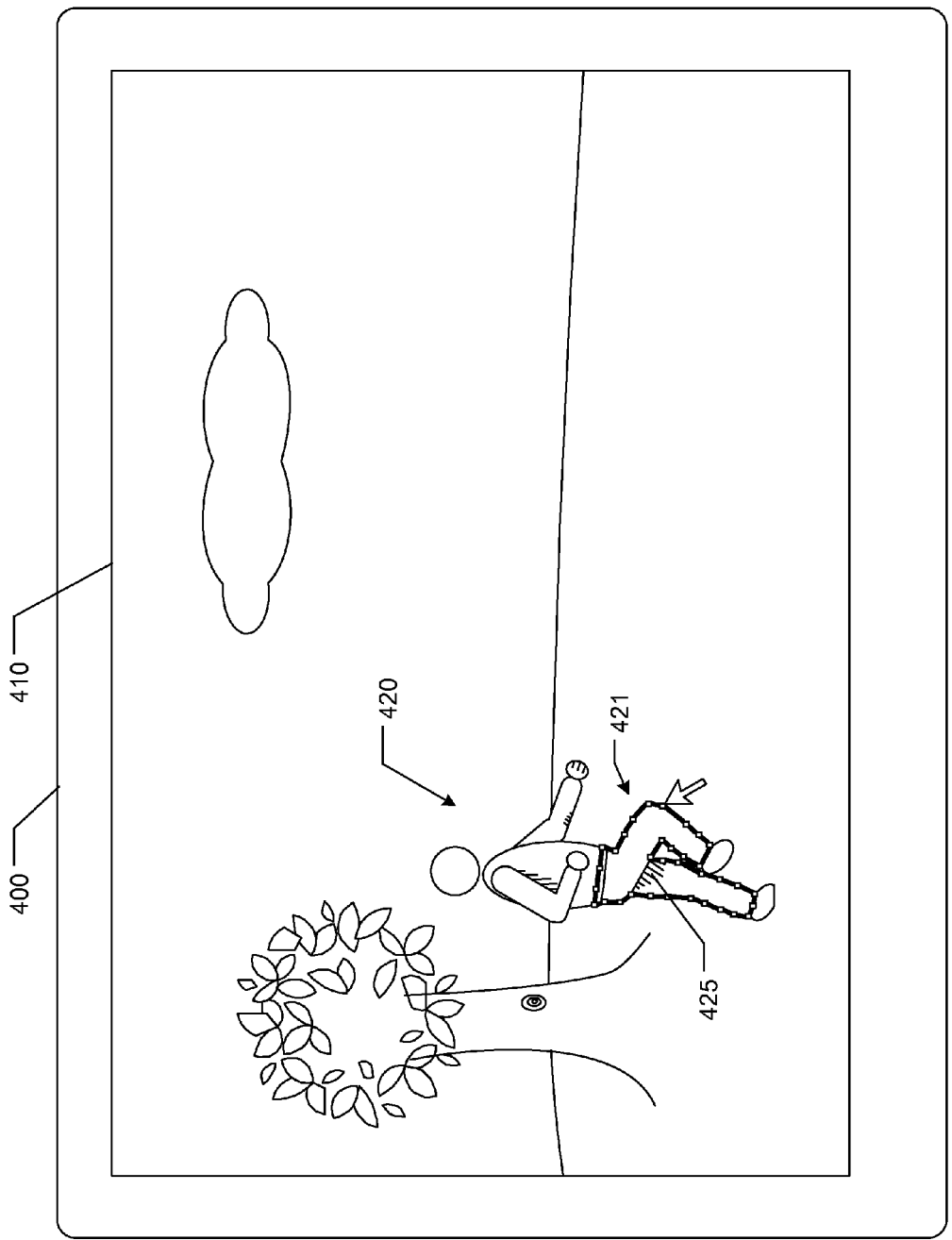
FIG. 4 is a graphical illustration of a user interface for allowing a user to interactively identify groups of segments for inclusion in a semantic region.

The outlining and interpolation procedure for creating semantic regions just introduced will now be described in greater detail with reference to FIG. 4 and FIG. 5. A graphical depiction of one user interface 400 that may be used by a user to perform the outlining procedure is shown in FIG. 4. Essentially, the user interface 400 displays a keyframe, which is a single frame of the current video. In that keyframe are several visual objects. In this example, a person 420 is shown having a pair of pants 421. As mentioned above, a spatio-temporal segmentation of the video may result in the pants 421 being composed of several different segments. For example, a shadow 425 on the pants 421 is likely a different enough color from the pants to result in a separate segment. However, suppose the user desires to apply a non-photorealistic stylization to the pants as an entity. In that case, the user interface 400 provides the user with a mechanism to outline the pants 421 by indicating several points around the perimeter of the pants 421. That outline is illustrated in FIG. 4 as a dark line enclosing the pants 421. Note that the shaded area 425 is within the enclosed area. This procedure may be repeated on subsequent keyframes at an appropriate interval. As discussed above, that interval may depend largely on the rapidity and complexity of the movement of the particular object being selected.

Although the example user interface 400 shown in FIG. 4 illustrates a single keyframe being displayed, it should be noted that an alternative user interface could be created that displays multiple keyframes simultaneously. Such an alternative implementation could be used to simplify the user's process of outlining groups of segments that correspond to the same larger entity by allowing the user to simultaneously visualize the larger entity in two (or more) different frames of video. For example, in one window a first keyframe could be displayed, and in a second window a second keyframe could be displayed that is 10 to 15 frames later in the video. This and many other alternatives will become apparent to those skilled in the art.

Figure 5:
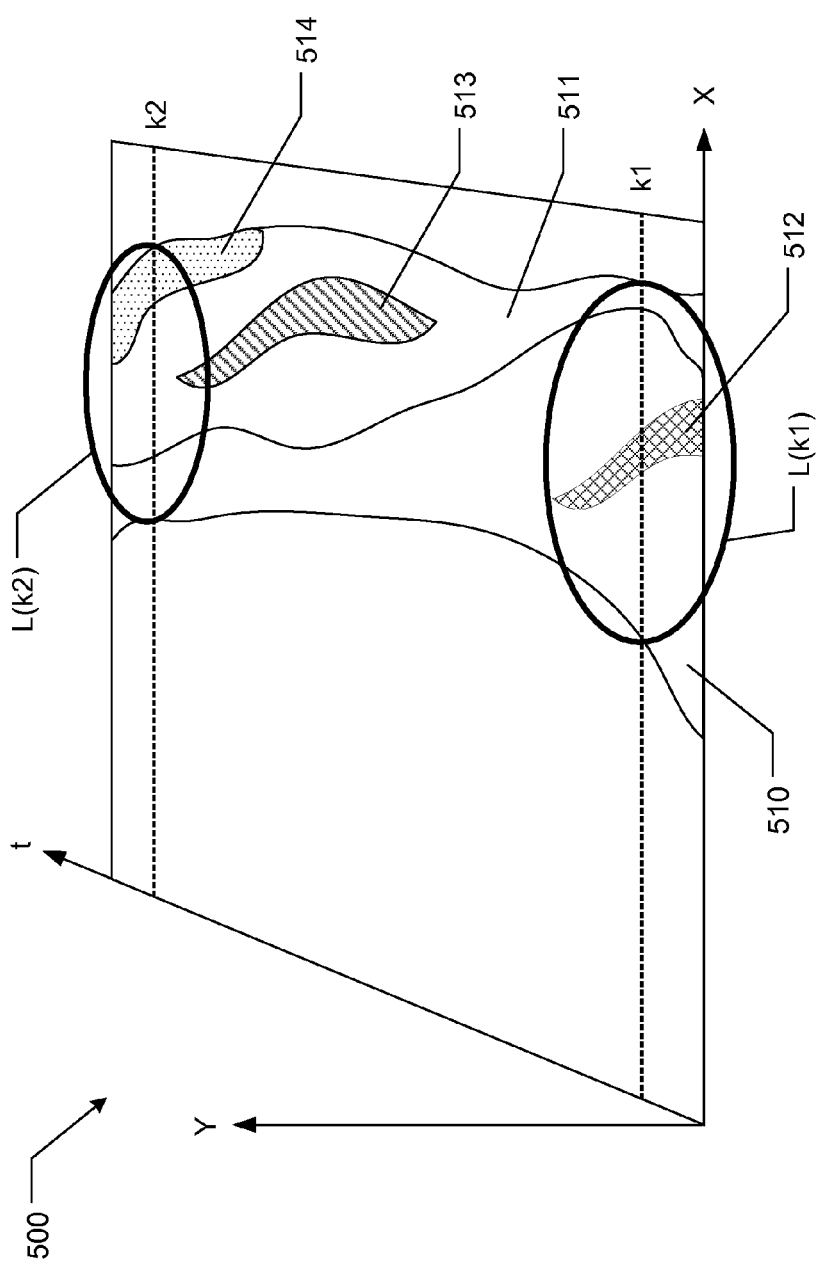
FIG. 5 is a graphical illustration of a slice of the video illustrated in FIG. 4 showing user-provided loops that identify the segments for inclusion in the semantic region.

Referring now to FIG. 5, an example of what a slice 500 of the video in time may look like is shown. A segmentation analysis has been performed on the video and several segments corresponding to the pants in FIG. 4 have been identified. For instance, segments 510-514 may correspond to various different portions of the pants 421 at different times. In particular, segment 512 may represent the shadow 425 on the pants 421. Note that some segments (e.g., segment 510) exist during the entire duration of the video, while other segments exist for only a portion of the duration of the video, such as only at the beginning (e.g., segment 512) or end (e.g., segment 514), or only somewhere between the beginning and end (e.g., segment 513).

In accordance with this implementation, the user draws two loop boundaries $L(k1)$ and $L(k2)$ on two keyframes $k1$ and $k2$, where $k2$ is later in time than $k1$. Each loop boundary encircles a set of segments, $S(k1)$ and $S(k2)$, that extend forward and backward in time. In this particular implementation, a segment is considered inside if the majority of pixels on the keyframe lie inside the user-drawn loop boundary.

A first approximation of the semantic region (e.g., the pants) between the keyframes can be arrived at by taking the union of the two sets $S(k1, k2)$. Note however that some segments may not be encompassed by either loop boundary L(k1) or L(k2) but yet still should be included in the resultant semantic region. For instance, as illustrated in FIG. 5, segment 513 does not exist on either keyframe k1 or k2, but is still completely enclosed by segments that are clearly part of the pants. Segments such as these, which exist only on non-keyframes, may be captured by applying the following logic:

(1) For each frame, t, where k1<t<k2, pixels that are fully surrounded by pixels contained in S(k1, k2) are marked.

(2) Each segment for which a majority of its pixels are marked and added to the set S(k1, k2) to create the more complete set S*(k1, k2).

The application of the preceding logic results in a set S*(k1, k2) that includes each segment within a larger semantic region. To complete this example, each segment associated with a larger semantic region is identified within the set S*(k1, k2).

Boundary Smoothing

"Cutting" the union along the time dimension achieves a set of in-between boundaries $L_{ms}(t)$, t=k1+1, ..., k2−1, which are interpolated results between L(k1) and L(k2) based on the union of segments from the segmentation results. Unfortunately, the set of boundaries $L_{ms}(t)$ often exhibit too much noise. Spatio-temporal segmentation techniques may be sensitive to small perturbations on the surfaces of the segments. This may result in noisy boundaries between regions due to high frequency detail occurring in the images or resulting from video interlacing. To address this, smoothness constraints may be incorporated into the interpolation procedure, both spatially and temporally. Several different smoothing techniques may be applied to address this situation. The following logic illustrates an illustrative mean shift constrained technique:

(1) The user inputs loops L(k1), L(k2), and keypoints defining the correspondence between them.

(2) A simple linear interpolant $L_s(t)$, t=k1+1, ..., k2−1 is computed by direct linear interpolation between L(k1) and L(k2) using parameterization based on the correspondence.

(3) A mean shift constraint $L_{ms}(t)$, t=k1+1, ..., k2−1 is computed by identifying the underlying merged volume S*(k1, k2) and slicing it successively between keyframes along the time axis.

(4) Correspondence is built between $L_s(t)$ and $L_{ms}(t)$ by using a shape correspondence algorithm.

(5) Using $L_s(t)$ as a starting guess, positions of $L_s(t)$ are iteratively adjusted to minimize a weighted sum of the difference from $L_{ms}(t)$ and a smoothness energy.

Step (3) is a general shape matching problem. This particular implementation uses a "shape context" approach since it is a robust method and produces satisfying results in most cases. This particular method attaches a descriptor, the shape context, to each point. The shape context at a reference point captures the distribution of the remaining points relative to it, thus offering a globally discriminative characterization. Corresponding points on two similar shapes will have similar shape contexts, and the correspondences are solved as an optimal assignment problem.

In step (4) the problem is put into an optimization framework and solved iteratively. Some number of points (e.g., five) per keypoint are distributed evenly along $L_s(t)$ and $L_{ms}(t)$. These are denoted as $P_s^i(t)$ and $P_{ms}^i(t)$, i=1, ..., $N_p$. A spatio-temporal smoothness energy may be defined as:

$$E_{smooth}(t) = \sum_{i=1}^{N_p-1} \left\{ \overrightarrow{P_s^i(t+1), P_s^{i+1}(t+1)} - \overrightarrow{P_s^i(t), P_s^{i+1}(t)} \right\} + \sum_{i=1}^{N_p} \left\{ \overrightarrow{P_s^i(t), P_s^i(t+1)} - \overrightarrow{P_s^i(t-1), P_s^i(t)} \right\}$$

The first term tries to keep the boundary shape the same from one frame to the next. The second term tales to minimize the $2^{nd}$ finite difference of a single point through time.

The mean shift constraint energy is defined simply as the sum of squared offsets of the current guess from the mean shift boundaries, $L_{ms}(t)$:

$$E_{ms}(t) = \sum_{i=1}^{N_p} \left( \|P_{ms}^i(t) - P_s^i(t)\|^2 \right)$$

The complete object function for minimization may then be defined as the weighted sum:

$$E = \sum_{t=k1+1}^{k2-1} [E_{smooth}(t) + w_{ms} E_{ms}(t)]$$

where $w_{ms}$ weights the mean shift constraint relative to the smoothness constraint. A typical setting for $w_{ms}$ may be 3.0 to avoid oversmoothing the mean shift results. The locally optimal positions for the $P_s^i(t)$ may be achieved using an iterative hill-climbing algorithm.

Figure 6:
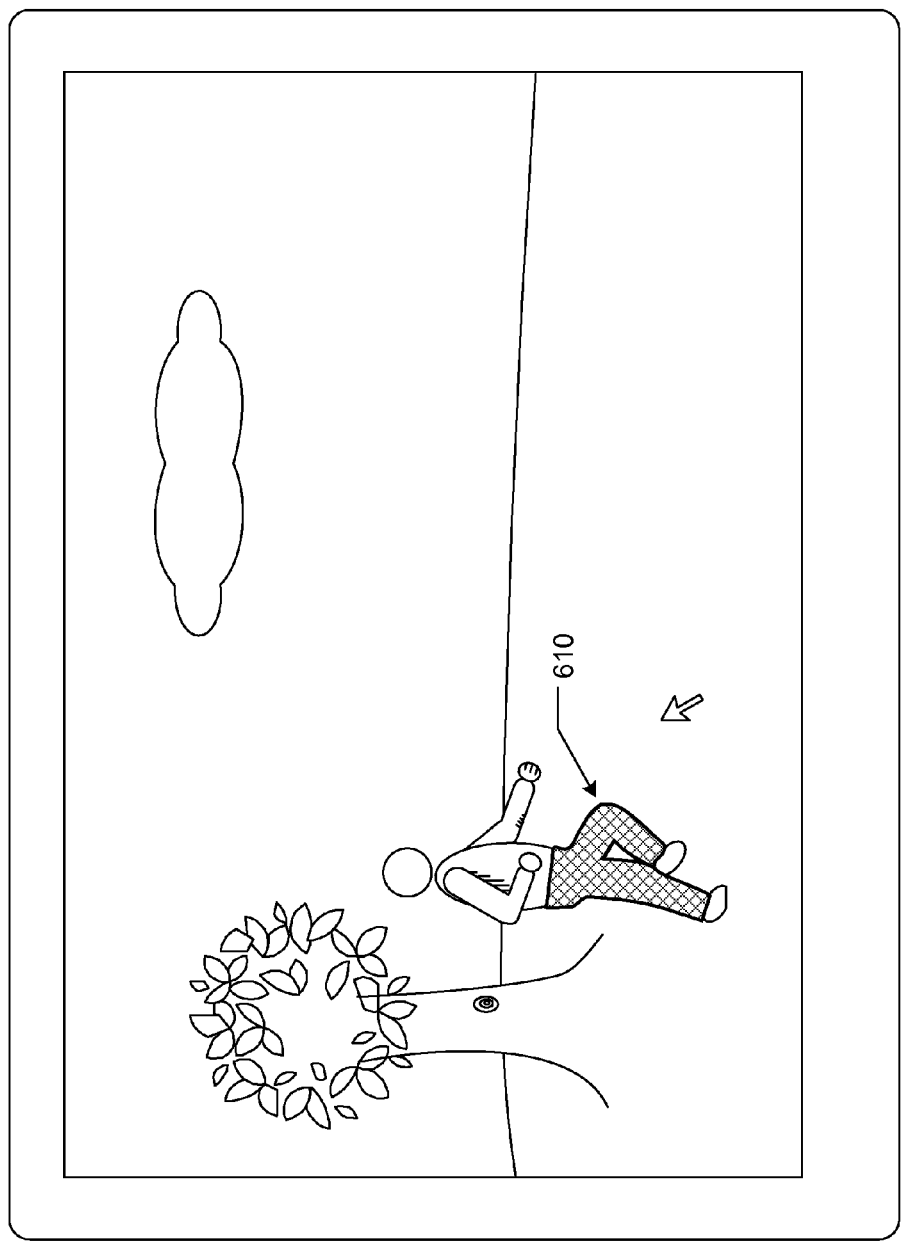
FIG. 6 is a graphical illustration of the video frame from FIG. 1 after having the semantic region identified and stylized as a single entity.

Referring now to FIG. 6, the resulting semantic region (i.e., the pants) may be represented as a continuous volume of 3D video data that may be stylized as an entity, rather than as independent segments. In this way, a stylization may be applied to the semantic region and flowed forward in time from frame to frame in a more coherent manner, without the visual "jumpiness" associated with conventional techniques.

Stylized Rendering

Once the pixelized representation of the semantic regions has been discovered using the above techniques, those semantic regions may be converted to 3D polyhedral surfaces for further processing. The conversion to 3D polyhedral surfaces serves two purposes: the reconstructed surfaces can be smoothed further using traditional object smoothing operations; and surface reconstruction makes the computation of edge sheets possible. The edge sheets may be used to render temporally coherent strokes in the stylized results. Stroke sheets may also be used within regions to allow modification of the region interiors.

An additional benefit of the conversion to 3D polyhedral surfaces is that the resulting shapes are resolution independent in both space and time. Thus, final rendering can be performed at any spatial or temporal resolution and compression/transmission methods no longer need to deal with discrete frame times.

In addition to the surface geometry, each semantic region is annotated with a color and an edge importance, $I_s$. The latter value may be set between, 1 (always draw an edge around this region) and 0 (does not contribute to the likelihood of drawing an edge). The edge importance of the background, for example, may be set to 0.

Semantic Region Surface Construction

A marching cubes algorithm may be used to convert the pixelized data into surface data resulting in polygonal surfaces separating the semantic regions. The goal is to smooth the semantic region volumes without introducing gaps in the video volume. Gaps are avoided by having semantic regions share the set of vertices forming their separating walls. One smoothing step moves each vertex to a weighted average of itself and 0.25 times the mean position of its connected neighbors. The smoothed regions can be rendered as solid colored polygons at any time t by intersecting them with a plane perpendicular to the time axis.

Edge Sheets

A user may also desire to add solid strokes to the final rendering similar to inked lines in a drawing. Selecting lines and their locations on a frame-by-frame basis causes a lack of temporal coherence. To address this, a set of smooth two dimensional sheets, or "edge sheets," may be constructed and embedded in the 3D video volume. These edge sheets may be sliced at each frame time to extract a curved line for rendering.

The edge sheets may be derived from the surface representations of the 3D semantic regions. Each triangle bounding a region may be annotated with the following properties:

$I_e$: Importance. The edge importance of a triangle is set to the sum of the two region importance values it separates.

$D_t$: Dot product of time axis with normal of triangle (N).

$D_l$: Dot product of "light direction" with N. Triangle normals, N, are assumed to face away from higher importance regions into lower importance regions or the background.

These values are then available to help determine whether a triangle should be used as part of an edge sheet, and if so what color and thickness should be used when rendering.

The importance value may be used to decide if a triangle should be potentially included to construct an edge sheet. The user sets a threshold between 0 and 1 to compare to the edge importance $1_e$ to decide if the triangle can be included in an edge sheet. Selected triangles may then be gathered into edge sheets by executing a series of steps in accordance with the following logic:

(1) Group contiguous potential triangles.
(2) Divide branching structures into individual sheets.
(3) Delete small groupings under a minimum size.

A branching structure occurs when a triangle edge is shared by more than two regions. The division into branching structures is performed by first grouping triangles bounding the region with the highest region edge importance, $I_s$. A tie may be resolved by simply choosing one. If branching structures still exist in a remaining subset, then the same process is repeated.

Each edge sheet is then copied into its own vertex/edge data structure. These polygonal edge sheets may then be smoothed. For instance, the boundaries may be low-pass filtered to avoid jagged edges that could cause temporal artifacts. In addition, or alternatively, internal vertex positions may be averaged with their adjacent vertices to provide geometric smoothness.

When sliced, the final smoothed edge sheets produce smooth curves that approximately follow the surfaces of the regions. The smoothing step may pull some edges away from the exact boundary between colored regions but this provides a good balance between stroke smoothness and semantic region shape.

Rendering an edge sheet at some time t involves first intersecting the edge sheet with a plane at time t to produce a curve. The curve can then be drawn in a number of styles that may or may not respond to the local parameters of each triangle intersected, $D_t$ and $D_l$. It also depends on more global spatio-temporal aspects of the edge sheet such as the length of the intersection curve, and the position of t relative to the temporal start and end of the edge sheet.

The thickness of the edge sheet may be set simply based on the length of the stroke in the 2D frame with a profile that tapers it at its ends. The present implementation begins by defining a basic style for the line that defines its profile along its length in the spatial domain parameterized by arc length. Many drawing and sketching systems provide such a choice.

The thickness of the edges varies according to position along the arclength, along their existence in time, and depending on how they are moving, according to the following relationship:

$$\text{Thickness} = T_{base} * T_{arc} * T_{time} * T_{motion}$$

Figure 7:
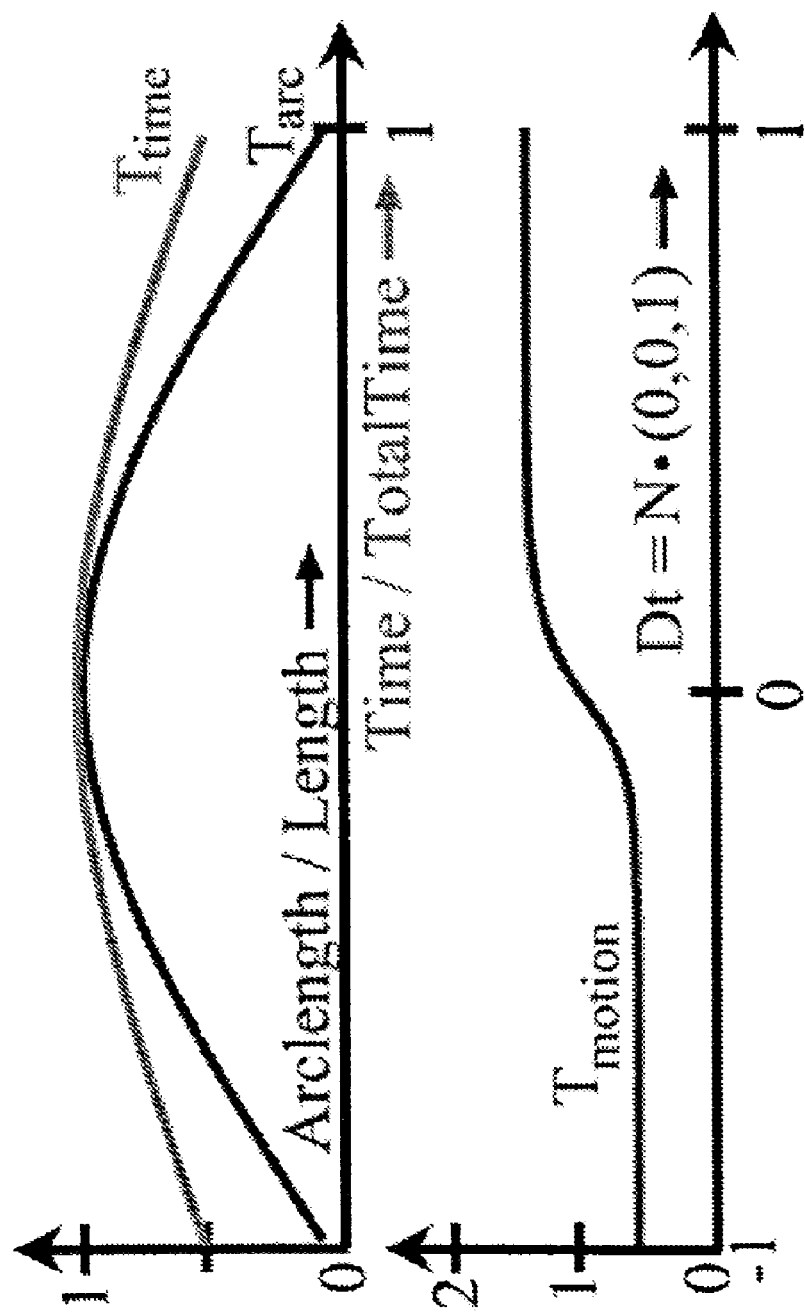
FIG. 7 is a pair of charts illustrating the relationships between criteria that may be used to set the thickness of edge sheets.

$T_{base}$ is set by the user and represents the thickness of the center of a still edge at the middle of its existence in time. The other terms vary as shown in FIG. 7. As the graphs imply, strokes thin at their ends both in space and time.

Triangles facing forward in time, (i.e., with positive $D_t$), on an edge sheet correspond to a "trailing edge", in other words the motion is moving away from this edge. A negative $D_t$ indicates a "leading edge" motion. Trailing edges may be rendered thicker than leading edges.

The line color may also be modified by its spatial orientation relative to a virtual light source using $D_l$, the dot product of "light direction" with the edge sheet normal. When we visualize the edge sheet as a whole, one can imagine a curved sheet that is thin along its edges. It is thickest in the center both along its spatial and temporal extent. It also tends to be thicker in portions that face along the time axis as opposed to facing backwards in time. Finally, the whole sheet may be lit from an infinite point source in some (x, y, 0) direction.

Figure 8C:
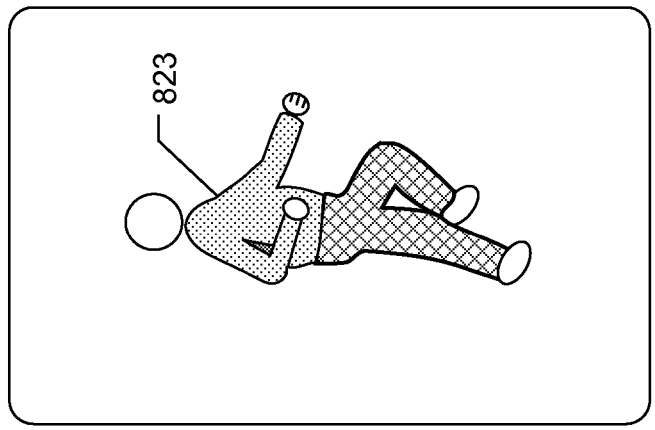
FIGS. 8A-C are graphical illustrations of various renderings of a semantic region using different edge sheet styles.
Figure 8B:
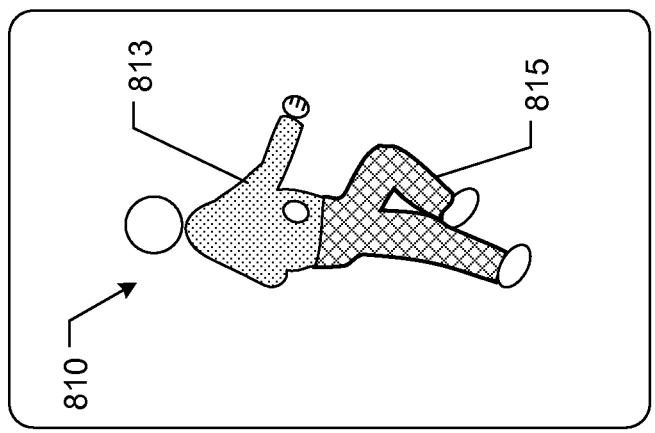
Figure 8A:
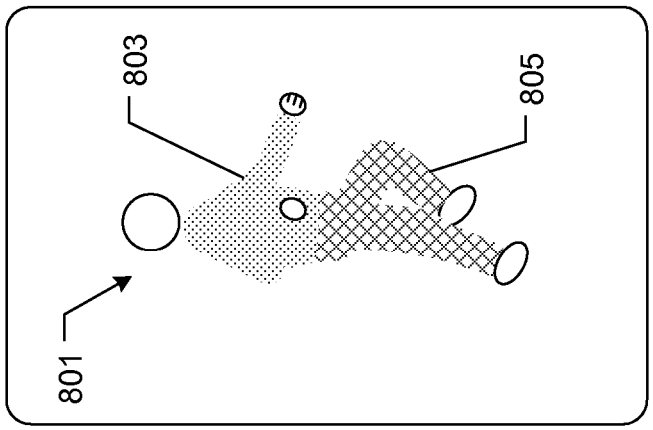

Referring briefly to FIGS. 8A and 8B, it can be seen how the rendering of a semantic region or its edge sheet may be performed using different techniques. First, in FIG. 8A, the person 801 has been rendered having, generally, two semantic regions: his shirt 803 and his pants 805. However, in this example, the semantic regions are rendered without a dividing line (edge sheet thickness of 0). In contrast, in FIG. 8B a person 810 is rendered having the same two semantic regions: a shirt 813 and pants 815. However, in this example, the edge sheet is drawn having a non-zero thickness, resulting in a visible line between the semantic regions.

In addition to drawing edges, the interiors of the semantic regions may be filled. There are several ways that the interiors can be filled. For example, by direct pixel coloring, dividing the regions into subregions and then coloring, by filling the regions with paint-like strokes, and the like. In addition, multiple fill techniques may be combined if desired, such as through standard compositing.

If performing pixel coloring, there are three colors associated with each pixel in a semantic region: the original pixel color, the average pixel color within a segment (such as may be determined by the mean shift procedure), or a user defined color for the larger semantic regions defined by the interaction procedure. These three colors can be combined as a weighted combination. Note that a full weight on any of the three could default to the original video, the mean shift result, or a solid colored shape respectively. Finally, any other color space transformation could be used to modify the result such as brightness and saturation, and hue controls.

In some cases it may be useful to allow users to define their own subregions. The same technique used to define the semantic region may be used to identify a subregion. In this particular implementation, the subregion is constrained to lie fully within a specified semantic region. This allows a second color region within a larger region in the final rendering. Referring to FIG. 8C, the use of a subregion is used to create a shadow within the shirt semantic region 823 to make the arm more visible.

The user may also lay down paint strokes within semantic regions at keyframes and have them automatically interpolated to create temporally coherent motion of the strokes. In much the same way that the edge sheets are created, 2D stroke sheets are created that are embedded within a semantic region. A user draws strokes within semantic regions on a keyframe, defining the stroke skeleton, color, and style. On subsequent keyframes intersecting the same semantic region, the user draws the new skeletons of each stroke.

Figure 9:
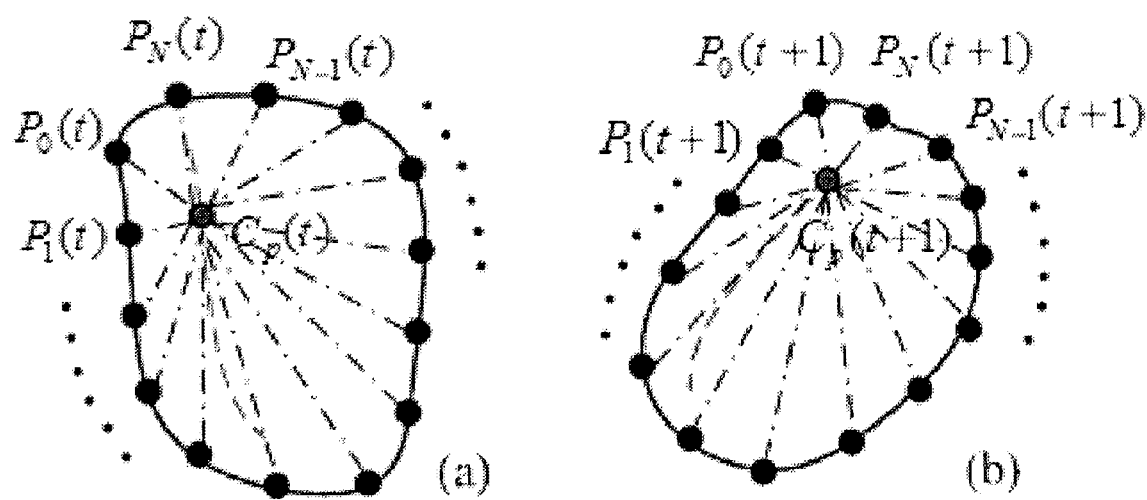
FIG. 9 is a graphical illustration of how to flow corresponding positions of a stroke in frames between two keyframes.

Between keyframes, k1, k2, strokes are flowed forward in time from k1 and backward in time from k2. FIG. 9 illustrates how to flow the corresponding positions of a stroke in frames between k1 and k2. Referring to FIG. 9, one point $C_p$ on the stroke is considered. Each stroke is sampled into 15 points along its length. From the previously described semantic region interpolation, there are N sample points along the boundary of the semantic region in which the stroke lies, denoted as $P_i(t)$, i=1, ..., N. Computing the distances $d_i$ between $C_p$ and $P_i(t)$ results in a vector of weights $<d_i>$, which uniquely describes the relative position of $C_p$ within the region.

On the next frame, the corresponding points along the boundary, $P_i(t+1)$, i=1, ..., N are examined. The new location of each point $P_i(t+1)$ is computed as a weighted average of these points using $<d_i>$ as the weights. Each control point along the stroke is processed in the same way.

In the same way the strokes are flowed backwards from k2. The final position is a linearly weighted average of the forward and backward flow, with the first weight dropping from 1 to 0 as time goes from k1 to k2 and from 0 to 1 for the reverse.

The interpolation of the strokes creates a two dimensional stroke sheet lying within the semantic region (although the final rendering of the strokes may overlap region boundaries). These sheets are sliced at a time t to provide a skeleton for a stroke to be rendered.

The background of the video may be defined as a single semantic region including the portions of the video lying outside the user defined semantic regions. The background can be filled just like any other semantic region.

The system solves the main challenge of providing temporal stability by leveraging a mean shift method applied to video data. The mean shift results together with user input provides a variety of non-photorealistic styles. The combination of 3D segmentation, an efficient semantic abstraction interface, edge sheets, and stroke sheets provides a very powerful system for the stylization of video.

Exemplary Operating Environment

The various embodiments described above may be implemented in various computing environments. One example computer environment suitable for use in implementations of the mechanisms and techniques described above is described in conjunction with FIG. 10.

Figure 10:
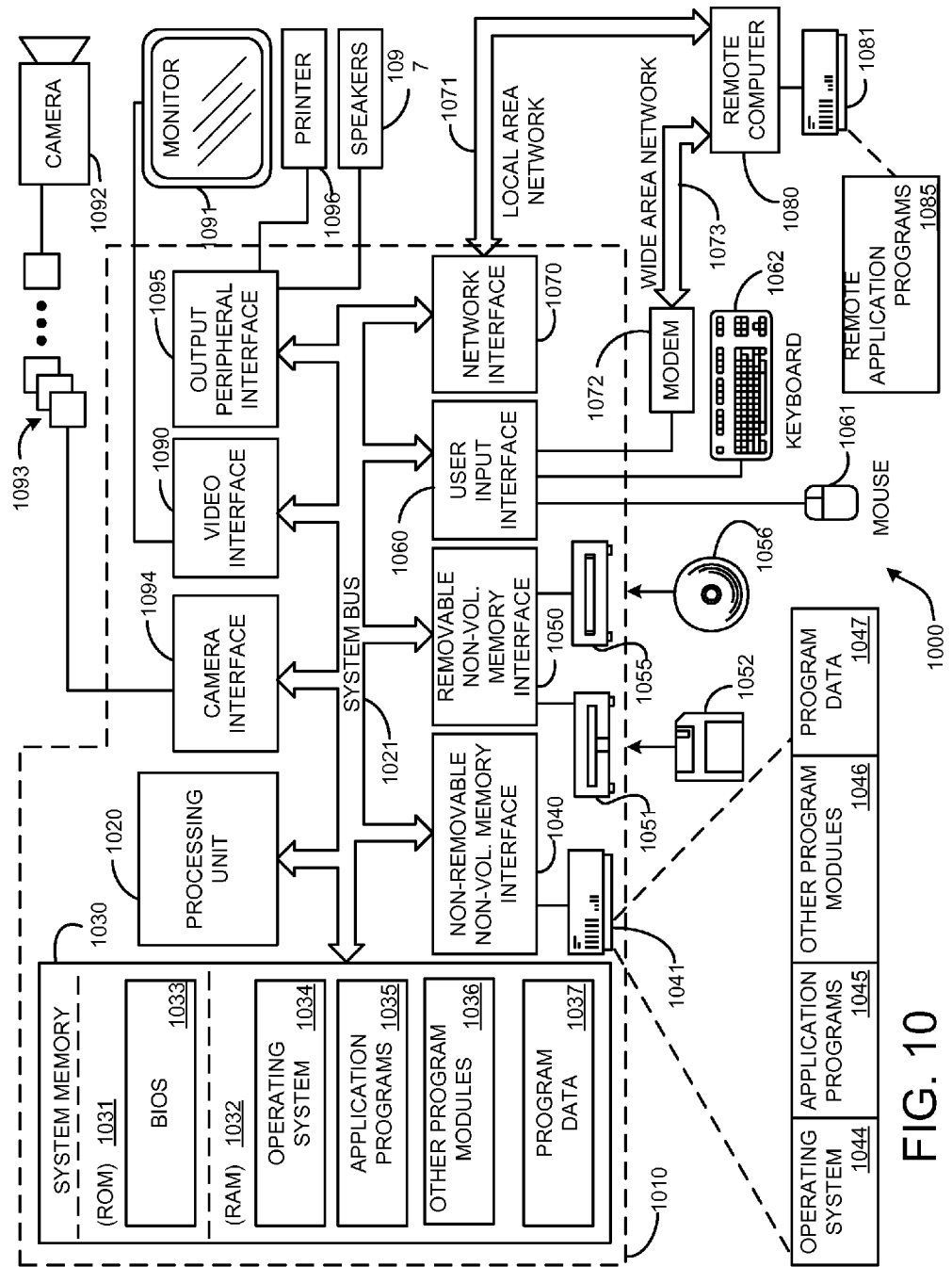
FIG. 10 is an illustrative computing environment that may be used to implement embodiments of the techniques and mechanisms described herein.

FIG. 10 illustrates an example of a suitable computing system environment 1000 on which the invention may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 10, an exemplary system for implementing the invention includes a general-purpose computing device in the form of a computer 1010.

Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 1010 through input devices such as a keyboard 1062 and pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus 1021, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

Further, the computer 1010 may also include, as an input device, a camera 1092 (such as a digital/electronic still or video camera, or film/photographic scanner) capable of capturing a sequence of images 1093. Further, while just one camera 1092 is depicted, multiple cameras could be included as input devices to the computer 1010. The use of multiple cameras provides the capability to capture multiple views of an image simultaneously or sequentially, to capture three-dimensional or depth images, or to capture panoramic images of a scene. The images 1093 from the one or more cameras 1092 are input into the computer 1010 via an appropriate camera interface 1094. This interface is connected to the system bus 1021, thereby allowing the images 1093 to be routed to and stored in the RAM 1032, or any of the other aforementioned data storage devices associated with the computer 1010. However, it is noted that image data can be input into the computer 1010 from any of the aforementioned computer-readable media as well, without requiring the use of a camera 1092.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A computer-readable storage medium having computer-executable instructions for stylizing video, the video comprising a plurality of frames, comprises:
    determining a plurality of volumetric objects by mean shift video segmentation, each volumetric object being a segment comprising a plurality of pixels;
    indicating on a subset of frames of the plurality of frames, defining keyframes, how a subset of the plurality of segments should be merged into a semantic region; and
    interpolating indication between the keyframes by a mean shift constrained interpolation technique to propagate the indication to frame
    between keyframes, wherein the mean shift constrained interpolation technique comprises:
    for each frame between the keyframes, marking pixels that are fully surrounded by pixels contained in the volumetric object; and
    for each segment outside of said segment subset having a majority of pixels being marked, adding the segment to the semantic region.

2. The computer-readable medium of claim 1, further comprising drawing paint strokes within the semantic region at keyframes.

3. The computer-readable medium of claim 2, wherein the paint strokes are similarly interpolated.

4. The computer-readable medium of claim 1, wherein a surface of the semantic region is smoothed.

5. The computer-readable medium of claim 1, wherein an edge sheet is determined that corresponds to a surface of the semantic region.

6. The computer-readable medium of claim 1, wherein a stroke sheet is determined that corresponds to a surface lying within the semantic region.

* * * * *